United States Patent [19]

Ebben

[11] Patent Number: 4,535,615
[45] Date of Patent: Aug. 20, 1985

[54] PROCESS AND APPARATUS USING ULTRA-FILTRATION IN THE PRODUCTION OF CAN SHELLS

[75] Inventor: Gerald J. Ebben, Barrington, Ill.
[73] Assignee: American Can Company, Greenwich, Conn.
[21] Appl. No.: 454,576
[22] Filed: Dec. 30, 1982
[51] Int. Cl.³ .................... B21D 22/20; B21D 51/26
[52] U.S. Cl. .................................. 72/39; 72/41
[58] Field of Search .................. 72/39, 41, 42, 43, 45, 72/46; 134/10

[56] References Cited

U.S. PATENT DOCUMENTS

| | | | |
|---|---|---|---|
| 2,140,289 | 12/1938 | Hurtt et al. | 72/43 |
| 3,424,118 | 1/1969 | Stolle et al. | 413/54 |
| 3,923,671 | 12/1975 | Knepp | 72/42 X |
| 4,034,692 | 7/1977 | Hennes et al. | 72/39 |

Primary Examiner—E. Michael Combs
Attorney, Agent, or Firm—Paul R. Audet

[57] ABSTRACT

In the production of drawn and ironed seamless metal cans an elongated sheet, for example, of tin-plated steel or aluminum, is lubricated and fed to a blanking and cupping press which cuts the sheet and forms it into shallow cups. The cups are fed to a series of ironing dies which thin the sidewalls of the cups and produce tall, smooth shells. While in the sidewall ironer the cups, shells and dies are flooded with an oil-in-water emulsion which acts as a lubricant and coolant. The can shells are trimmed to obtain a uniform height, and washed. The lubricant-coolant is re-circulated to and from the wall ironer by the coolant system which contains tanks, pumps, conventional plate-frame filter, chiller, etc. to remove heat and contaminants. Can shells emerging from the ironing process carry a relatively large amount of coolant as "drag out". Some of the dragged out coolant is dripped into the waste pit while the rest is removed in the can-washing operation.

The addition of a prerinse preferably between the ironing and trimming operations removes most of the "drag out". The effluent from the pre-rinse is then dewatered by use of an ultra-filtration pressure membrane system to concentrate it back to "use" concentration (as an emulsion) for direct return to the coolant system for re-use in the ironing process. The water removed, the permeate, is re-used in the prerinse station.

6 Claims, 2 Drawing Figures

PROCESS AND APPARATUS USING ULTRA-FILTRATION IN THE PRODUCTION OF CAN SHELLS

BACKGROUND OF THE INVENTION

The present invention relates to a method and apparatus useful in the production of drawn and ironed seamless metal cans.

One type of widely used container is known as a "two-piece can" and consists of a one-piece seamless metal shell and a top. Such two-piece cans are widely used for beverages and food products and may be made of aluminum, tin-plated steel or other metals.

A widely used process to produce the can shells, which are deep seamless container bodies, from flat sheets or disks is known as the "D and I", or drawing and ironing process. In the drawing and ironing process the blank sheet, for example, a flat sheet metal blank, is drawn into a shallow cup form in one or more drawing operations using a punch mounted on a press and a drawing die. Subsequently the shallow cup is processed through ironing operations, for example, ironing dies in the form of ironing rings in which the sidewall of the cup is progressively thinned and elongated. The ironing dies, by thinning the sidewall of the drawn cup, cause a flow of the metal away from the base of the cup, thereby increasing its height while the thickness of the cup bottom remains substantially unchanged.

The drawing and ironing process has been widely used to produce seamless shells, and many patents have issued in the United States and abroad directed to the process and machines used to produce such shells. Among such prior patents are American Can Company's prior U.S. Pat. No. 3,670,543 entitled "Drawing and Ironing Process" and U.S. Pat. No. 3,360,157 entitled "Method of Forming A Coated Metal Container and Artical Produced Thereby."

It is of great importance in the drawing and ironing process that the shells be properly lubricated and cooled during the processing steps. The process requires that the shells be produced and conveyed at very high speeds, for example, 300 shells per minute in a single production unit, in order for the process to be economically feasible. If the shells are not properly cooled or lubricated, they may bind, i.e., become stuck, in the ironing ring and on the punch and the rings may be quickly worn out. The ironing process, since it involves a flow of metal and friction, produces a considerable amount of heat. Such heat, unless removed by cooling fluid, would cause contraction of the metal ironing rings, causing the rings to be damaged or to be of an improper size, and further may bind a shell in the ring or on the punch.

It is presently known, consequently, that a coolant and lubricant, consisting of an oil-in-water emulsion, should be flooded onto the can shells before and while they are being ironed in the ironing rings. The materials used for the oil-in-water emulsion, since they must resist breakdown under high pressure, may be relatively expensive organic compounds. Furthermore, since the rate of production is desired to be very high, a considerable quantity of the emulsion is required to be flooded onto the can shells.

The can shells, subsequent to their emergence from the ironing rings, are cut to the proper height in a trimming operation. The can shells are conveyed from the last ironing ring to the trimming station by means of a conveyor belt or other conveyor system. A large quantity of the dragged out waste emulsion falls from the cans while being conveyed between the last ironing ring and the trimming operation and while being conveyed to the can washer. Subsequent to the trimming operation, the cans are washed and the surfaces prepared for subsequent processing using chemicals and water in a can washer. However, a relatively expensive operating process must be used in the can washer since the can's surface must be freed of the emulsion remaining on them from the ironing process to make them satisfactorily processable in subsequent operations.

The waste emulsion, which is the emulsion which is dripped from the cans, contains the lubricant oil, the water phase of the oil-in-water emulsion, and dirt or soil which has been carried along with the emulsion. This emulsion has been considered a costly waste and presents a problem in pollution control. Since a large quantity of the emulsion must be used for cooling, the amount of such waste emulsion is considerable. With increased emphasis on environmental control, and particularly on the quality of the water which is removed from the factory to the environment, it is necessary to treat the waste. The required pollution control equipment, because of the large volume of waste treated, may be both relatively expensive to install and operate.

OBJECTIVES AND FEATURES OF THE INVENTION

It is an objective of the present invention to provide a method and apparatus in the production process of making drawn and ironed seamless metal can shells which will conserve the lubricant-coolant which is applied to the drawn cups while they are being ironed (especially that dragged out of the system) by re-using the same lubricant-coolant a plurality of times.

It is a further objective of the present invention to provide such a method and apparatus in which the can shells are produced with relatively less soil so that the subsequent washing step may use less chemicals and water and less expensive and smaller size can washing equipment.

It is a further objective of the present invention to provide such a method and apparatus in which the removal of liquids from the production process is relatively cleaner and consists essentially only of water.

It is a further objective of the present invention to provide such a method and apparatus in which relatively little of the lubricant-coolant falls from the production line so that less waste is gathered in the sub-floor pit and the waste which is gathered, since it does not contain substantial amounts of lubricant, does not require an emulsion breaking-oil removal pre-treatment.

It is a further objective of the present invention to provide such a method and apparatus in which, since the lubricant-coolant is separated and re-used, the pollution control equipment need handle relatively less material and may therefore be smaller in size and less costly to operate.

It is a feature of the present invention to provide an improvement in the process of producing drawn and ironed can shells consisting of rinsing the can shells with water subsequent to the last ironing step and then separating the coolant from the rinse water by dewatering the combined coolant and rinse water by processing it through an ultra-filtration pressurized membrane system. The separated coolant can be returned to the coolant system for re-use in the ironing operation and the removed water can be re-used for rinsing the can shells.

BRIEF DESCRIPTION OF THE DRAWINGS

Other objectives and features of the present invention will be apparent from the following detailed description which should be taken in conjunction with the accompanying drawings.

In the drawings.

DETAILED DESCRIPTION OF THE INVENTION

Figure 1:
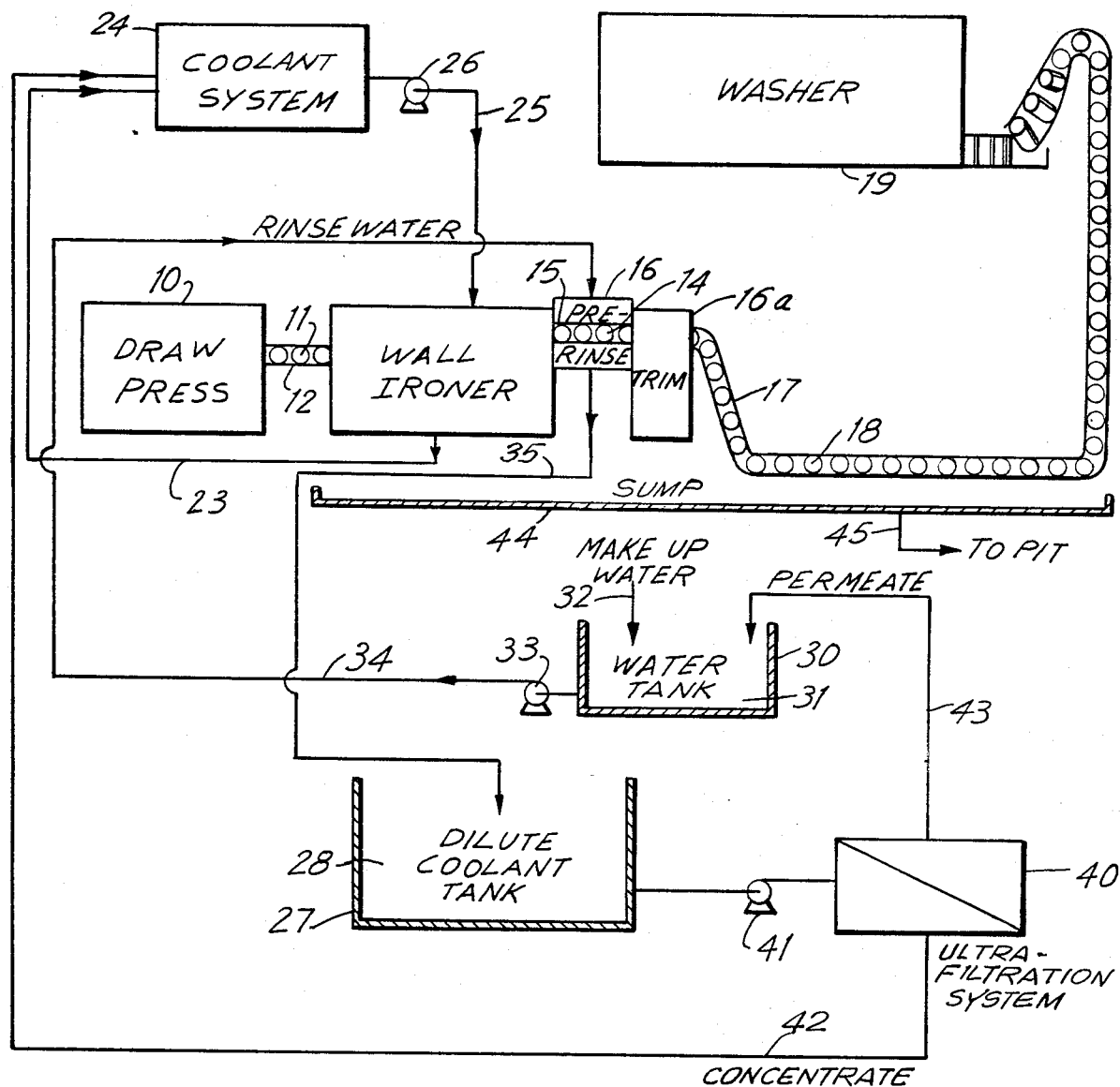
FIG. 1 is a schematic view showing the method and apparatus of the present invention.

The sheet metal bank (body plate), which may be in the form of an elongated coil which is flattened out, is fed to the drawing press 10. For example, the metal may be sheet aluminum or tin-plated steel. The drawing press 10 cuts the blank and forms it into shallow cups 11 which are conveyed by the conveyor belt 12 to the wall ironer 13. The wall ironer 13 comprises a set of ironing dies such as a tandem set of ironing rings. The cups 11 have their sidewalls elongated in the ironing dies, of the wall ironer 13, to produce the elongated shells 14.

A conveyor 15 transports the shells 14 through a pre-rinse machine 16, for example, a pressure spray rinser. The conveyor 15 then conveys the shells 14 to a trimming machine 16a which cuts the free upper ends of the shells 14 so that the shells have a uniform height. A conveyor 17 conveys the trimmed shells 18 to a can washer 19 which, using chemicals and water, cleans the shells and prepares the surfaces for subsequent processing in the can line.

While the shells 11 are being processed through the wall ironer 13, it is important that they be adequately lubricated and cooled. For that purpose an oil-in-water emulsion is used which contains oil lubricants such as mineral and/or synthetic oil in the form of droplets dispersed in the water phase. The emulsion also preferably contains emulsifiers to keep the oil droplets evenly dispersed in the water phase and a corrosion inhibitor to prevent rust or corrosion from damaging the machinery. The oil-in-water emulsion coolant is normally handled by a circulating coolant system 24 with conventional plate-frame filter and optional heat-exchanger. The term "coolant" is being used to refer to the oil-in-water emulsion which is used both for lubricaton and for cooling. The coolant system 24 conditions the coolant received from the wall ironer through fluid line 23. The coolant is then pumped through the fluid line 25, by the pump 26, and flooded onto the parts and shells in the wall ironer 13.

A separate circulating system is used to bring rinse water to the pre-rinse station 16. That fluid circulating system includes the water tank 30 which holds the rinse water 31. Make-up water is piped to the water tank 30 through the fluid line 32. The pump 33 pumps the water 31 from the water tank 30 through the fluid line 34, as rinse water, to the pre-rinse station 16, which is now mixed with coolant rinsed from the can shells, is gathered in the pre-rinse station and returned by the fluid line 35 to the dilute coolant tank 27.

The mixture of coolant rinsed from the can shells and water in the coolant tank 27 forms a diluted coolant emulsion 28 which is concentrated by means of the ultra-filtration system 40. A pump 41 pumps the dilute coolant 28 from the dilute coolant tank 27, to the ultra-filtration system 40. The ultra-filtration system 40 produces a "concentrate" in which the coolant is concentrated and a "permeate" which is substantially clear and clean water.

When the emulsion concentration in the concentrate of the ultra-filtration system reaches that of the original emulsion in the coolant system 24, it is bled off through fluid line 42 to the coolant system 24 for direct re-use in the ironing process. The substantially clean water permeate is carried by fluid line 43 to the water tank 30 to be re-used for rinsing as rinse water 31.

The sub-floor of the factory has a fluid collecting sump 44 whose drain line 45 leads to a waste water effluent pit. The waste water (mainly consisting of can shell drippage or drap-out) from the pit is treated in the water pollution control equipment (not shown).

Figure 2:
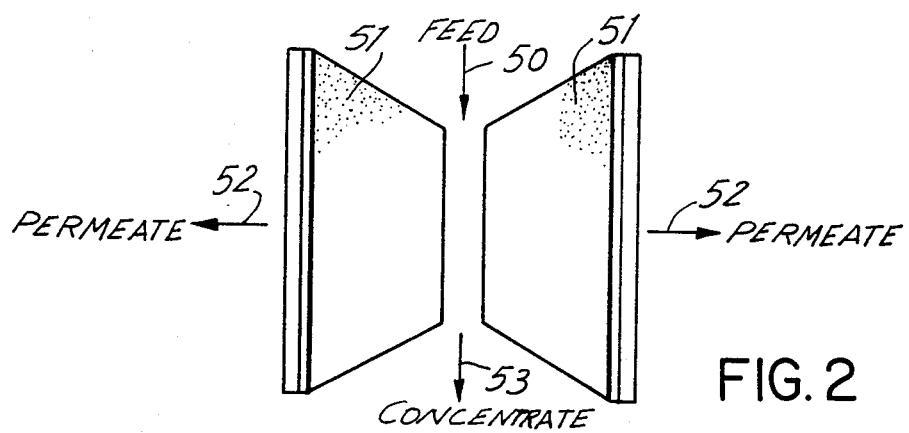
FIG. 2 is a perspective view illustrating the ultra-filtration process.

The ultra-filtration system, as shown in FIG. 2, is conventional in which the feed 50 passes on one side of the semi-permeable membranes 51. The permeate 52, essentially clean water, passes through the pores of the membranes 51, and the feed 50 becomes concentrated with reduced volume to exit as concentrate 53. Preferably each membrane 52 consists of cellulose acetate (although other materials like polysulfone, etc. may be used) having a pore size about 5-100 angstroms in diameter. The membrane thickness may be 0.003-0.005 inch. Rejection of the lubricant oil droplets is almost 100% for most coolants. The feed pressure is in the range of 25-250 lbs. per square inch.

What is claimed is:

1. In the process of producing drawn and ironed can shells from sheet metal by drawing cup-shaped cups from the sheet metal, elongating the sidewalls of the cups by ironing the sidewalls in a series of ironing rings of a die stack, applying an oil-in-water emulsion coolant from a coolant system as a lubricant and coolant into the die stack, and trimming the free end of the drawn and ironed cups to obtain can shells having uniform height, the improvement of:

rinsing the can shells with water subsequent to the last ironing step, and prior to trimming, thereby mixing coolant and rinse water;

separating the coolant from the rinse water by passing the combined coolant and rinse water along one side of a membrane in an ultrafilter pressurized membrane system;

returning the re-concentrated coolant to the coolant system for re-use in the ironing process; and using the separated rinse water as the said rinse water subsequent to the last ironing step, and prior to trimming.

2. The process as in claim 1 and further including rinsing the can shells with fresh water prior to trimming.

3. The process as in claim 1 wherein the can shells are rinsed with the separated rinse water prior to trimming.

4. Apparatus for the production of drawn and ironed can shells from sheet metal, including means for drawing cup-shaped cups from the sheet metal, an ironing die stack for elongating the sidewalls of the cups by ironing the sidewalls in a series of ironing dies, coolant means for applying an oil-in-water emulsion coolant as a lubricant and coolant into the die stack, and means for trimming the free end of the drawn and ironed shells to obtain a uniform height, characterized in that the apparatus also includes:

means for rinsing the can shells with water subsequent to the last ironing die and prior to trimming;

means for separating the coolant from said rinse water after said rinsing by passing the combined coolant and rinse water along one side of a membrane in an ultrafilter pressurized membrane system;

means for returning the re-concentrated coolant to the coolant means for re-use in the ironing process; and means for applying the separated rinse water as the said rinse water subsequent to the last ironing die and prior to trimming.

5. The apparatus of claim 4 and further including means for rinsing the can shells with fresh water prior to trimming.

6. The apparatus of claim 4 and further including means for rinsing the shells with the separated rinse water prior to trimming.

* * * * *